US012689431B2

(12) United States Patent　　(10) Patent No.: US 12,689,431 B2
　　Ghim et al.　　　　　　　　　　　(45) Date of Patent: Jul. 21, 2026

(54) DEVICE AND METHOD FOR IDENTIFYING POLARIZATION FOR UPLINK TRANSMISSION IN WIRELESS COMMUNICATION SYSTEM

(71) Applicant: SAMSUNG ELECTRONICS CO., LTD., Suwon-si (KR)

(72) Inventors: Jaegon Ghim, Suwon-si (KR); Heeyoon Kwak, Suwon-si (KR); Yunbum Lee, Suwon-si (KR); Kwan Heo, Suwon-si (KR); Changhyun Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 581 days.

(21) Appl. No.: 18/308,297

(22) Filed: Apr. 27, 2023

(65) Prior Publication Data

US 2023/0261731 A1　　Aug. 17, 2023

Related U.S. Application Data

(63) Continuation of application No. PCT/KR2022/007783, filed on May 31, 2022.

(30) Foreign Application Priority Data

Jun. 2, 2021　(KR) ........................ 10-2021-0071669

(51) Int. Cl.
*H04W 4/00*　　　(2018.01)
*H04B 7/0404*　　(2017.01)
　　(Continued)

(52) U.S. Cl.
CPC ............. *H04B 7/10* (2013.01); *H04B 7/0404* (2013.01); *H04W 72/232* (2023.01)

(58) Field of Classification Search
None
See application file for complete search history.

(56) References Cited

U.S. PATENT DOCUMENTS 7,103,385 B2 * 9/2006 Takeuchi ........... H04B 7/18532
　　　　　　　　　　　　　　　　455/12.1
9,173,221 B2 　 10/2015 Cordeiro et al.
　　　　　　　　(Continued)

FOREIGN PATENT DOCUMENTS

CN　　　111480303 A　　7/2020
KR　　20160144167 A　　12/2016
　　　　　　(Continued)

OTHER PUBLICATIONS

3GPP TSG-RAN WG1 #105-e, "Beam management and polarization signaling for NTN", e-Meeting, May 10-27, 2021, Panasonic, 6 pages.

(Continued)

*Primary Examiner* — Zewdu A Beyen
(74) *Attorney, Agent, or Firm* — NIXON & VANDERHYE P.C.

(57) ABSTRACT

A 5$^{th}$ generation (5G) and/or pre-5G communication system for supporting a higher data transmission rate than a 4$^{th}$ generation (4G) communication system such as long term evolution (LTE) may be provided. An electronic device, in a wireless communication system, may include: a communication circuit; and at least one processor operatively connected to the communication circuit, wherein the at least one processor is configured to: receive downlink control information (DCI) from a base station; when the DCI does not include information indicating a transmitted precoding matrix indicator (TPMI), and, when a combination of one or more variables indicates a first polarization in a pre-configured table, transmit an uplink signal to the base station by using the first polarization; and, when the combination of the (Continued)

one or more variables indicates a second polarization in the pre-configured table, transmit the uplink signal to the base station by using the second polarization, wherein the one or more variables include at least one of an antenna module, an operating band, or a channel which is used for transmitting the uplink signal.

20 Claims, 9 Drawing Sheets

(51) Int. Cl.
  *H04B 7/10* (2017.01)
  *H04W 72/232* (2023.01)

(56) References Cited

U.S. PATENT DOCUMENTS

| | | | |
|---|---|---|---|
| 10,057,796 | B2 | 8/2018 | Elsherbini et al. |
| 2006/0046638 | A1 | 3/2006 | Takeuchi et al. |
| 2016/0072565 | A1 | 3/2016 | Yu et al. |
| 2017/0195012 | A1 | 7/2017 | Suh |
| 2017/0294705 | A1 | 10/2017 | Khripkov et al. |
| 2019/0150003 | A1 | 5/2019 | He et al. |
| 2020/0314934 | A1 | 10/2020 | Raghavan et al. |
| 2020/0322812 | A1 | 10/2020 | Shi et al. |
| 2021/0050889 | A1 | 2/2021 | Park et al. |
| 2021/0136566 | A1* | 5/2021 | Manolakos ............. H04W 8/24 |
| 2021/0143875 | A1* | 5/2021 | Svendsen ............. H04B 7/0695 |
| 2022/0109491 | A1* | 4/2022 | Ma ........................... H04B 7/10 |

FOREIGN PATENT DOCUMENTS

| | | | | |
|---|---|---|---|---|
| KR | 102115901 | B1 | 5/2020 | |
| KR | 20200102896 | A | 9/2020 | |
| WO | 2021058576 | A1 | 4/2021 | |
| WO | WO-2021058567 | A1 * | 4/2021 | .............. H04B 7/10 |
| WO | 2021098058 | A1 | 5/2021 | |

OTHER PUBLICATIONS

Office Action dated Jan. 14, 2026 in corresponding Korean Application KR10-2021-0071669 with translation.

* cited by examiner

100

BASE STATION
(220)

TERMINAL
(210)

DEVICE AND METHOD FOR IDENTIFYING POLARIZATION FOR UPLINK TRANSMISSION IN WIRELESS COMMUNICATION SYSTEM

CROSS-REFERENCE TO RELATED APPLICATIONS

This application is a continuation of International Application No. PCT/KR2022/007783 filed on May 31, 2022, designating the United States, and claiming priority to Korean Patent Application No. 10-2021-0071669 filed on Jun. 2, 2021, in the Korean Intellectual Property Office, the disclosures of all of which are hereby incorporated by reference herein in their entireties.

BACKGROUND

Field

Certain example embodiments generally relate to a wireless communication system, and for example, to an apparatus and/or a method for identifying a polarization for uplink transmission in a wireless communication system.

Description of Related Art

In single input single output (SISO) communication, a base station may indicate a polarization for uplink transmission to a terminal. However, when the base station is not able to indicate the polarization to the terminal, the terminal may need to select the polarization by itself.

SUMMARY

Certain example embodiments may provide an apparatus and/or a method for identifying a polarization for uplink transmission in a wireless communication system.

In addition, certain example embodiments may provide an apparatus and/or a method for identifying a polarization for uplink transmission without an additional algorithm.

In addition, certain example embodiments may provide an apparatus and/or a method for identifying a polarization for uplink transmission without spending an additional search time in a wireless communication system.

In addition, certain example embodiments may provide an apparatus and/or a method for identifying a polarization having excellent radiation characteristics according to a frequency band in which an uplink signal is transmitted in a wireless communication system.

In addition, certain example embodiments may provide an apparatus and/or a method for identifying a polarization having excellent radiation characteristics according to a position of a terminal where an antenna module, comprising at least one antenna, is mounted in a wireless communication system.

According to an example embodiment, an electronic device in a wireless communication system may include: a communication circuit; and at least one processor operatively connected, directly or indirectly, to the communication circuit, and the at least one processor may be configured to: receive downlink control information (DCI) from a base station; when the DCI does not include information indicating a transmitted precoding matrix indicator (TPMI), and, when a combination of one or more variables indicates a first polarization in a pre-configured table, transmit an uplink signal to the base station by using the first polarization; and, when the combination of the one or more variables indicates a second polarization in the pre-configured table, transmit the uplink signal to the base station by using the second polarization, and the one or more variables may include at least one of an antenna module/antenna information, an operating band, or a channel which is used for transmitting the uplink signal.

According to an example embodiment, a method performed by an electronic device in a wireless communication system may include: receiving downlink control information (DCI) from a base station; when the DCI does not include information indicating a transmitted precoding matrix indicator (TPMI), and, when a combination of one or more variables indicates a first polarization in a pre-configured table, transmitting an uplink signal to the base station by using the first polarization; and, when the combination of the one or more variables indicates a second polarization in the pre-configured table, transmitting the uplink signal to the base station by using the second polarization, and the one or more variables may include at least one of an antenna module, an operating band, or a channel which is used for transmitting the uplink signal.

The apparatus and/or the method according to various example embodiments may identify a polarization for uplink transmission in a wireless communication system.

In addition, the apparatus and the method according to various example embodiments may identify a polarization for uplink transmission without an additional algorithm.

In addition, the apparatus and the method according to various example embodiments may identify a polarization for uplink transmission without spending an additional search time.

In addition, the apparatus and the method according to various example embodiments may identify a polarization having excellent radiation characteristics according to a frequency band in which an uplink signal is transmitted in a wireless communication system.

In addition, the apparatus and the method according to various example embodiments may identify a polarization having excellent radiation characteristics according to a position of a terminal where an antenna module is mounted.

BRIEF DESCRIPTION OF DRAWINGS

The above and other aspects, features and advantages of certain embodiments will be more apparent from the following detailed description, taken in conjunction with the accompanying drawings, in which.

DETAILED DESCRIPTION

Terms used in the disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the present disclosure.

In addition, in the disclosure, the expression "exceeding" or "being less than" may be used to determine whether a specific condition is satisfied, fulfilled, but these are just for expressing one example and do not exclude the expression "being greater than or equal to" or "being less than or equal to". The condition described by "being greater than or equal to" may be substituted with "exceeding", the condition described by "being less than or equal to" may be substituted with "being less than", and the condition described by "being greater than or equal to and less than" may be substituted with "exceeding and being less than or equal to".

In addition, the disclosure describes various embodiments by using terms used in some communication standards (for example, long term evolution (LTE), new radio (NR) defined in 3rd generation partnership project (3GPP)), but these embodiments are merely examples. Various example embodiments may be easily modified and applied to other communication systems.

The disclosure described hereinbelow relates to an apparatus and a method for identifying a polarization for uplink transmission in a wireless communication system. Specifically, the disclosure describes technology for identifying a polarization of an antenna port in order for a terminal to perform signal input single output (SISO) communication.

Figure 1:
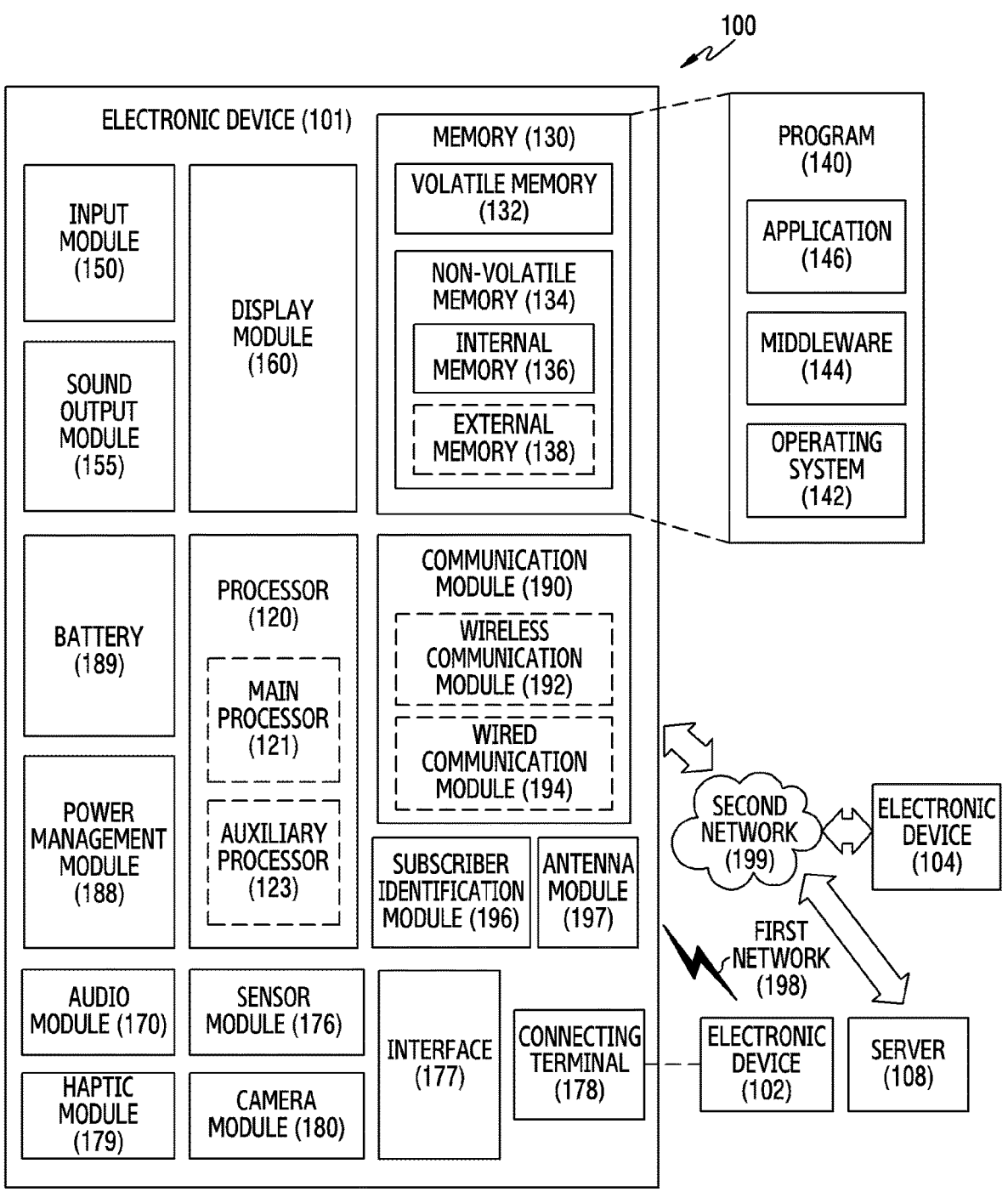
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled, directly or indirectly, with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected, directly or indirectly, with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement)

or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190, comprising communication circuitry, may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192, comprising communication circuitry, may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form or comprise a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled, directly or indirectly, with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
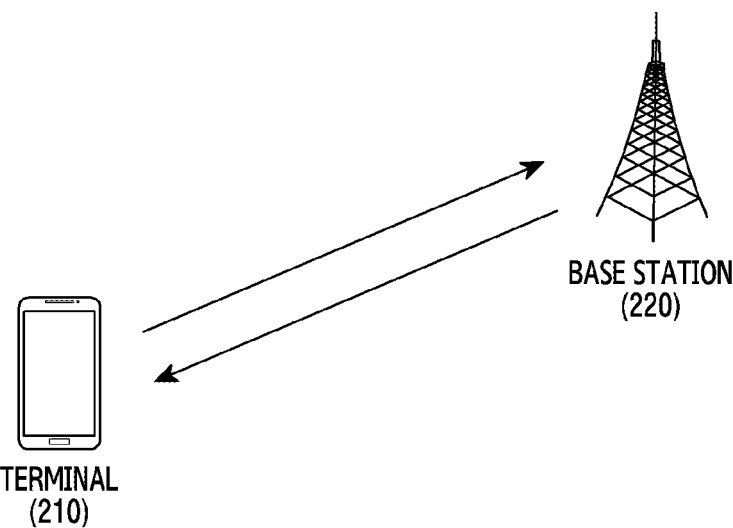
FIG. 2 is a view illustrating an example of a wireless communication system according to various example embodiments.

FIG. 2 illustrates an example of a wireless communication system according to example embodiments. Referring to FIG. 2, a terminal 210 and a base station 220 are illustrated as part of nodes using a wireless channel in a wireless communication system. The terminal 210 may be connected, directly or indirectly, with a plurality of base stations. Although not shown in FIG. 1, base stations may be connected with the terminal 210 through multiple connectivity (for example, dual connectivity (DC)).

The terminal 210 may connect to a data network through the base station 220 and a user plane function (UPF). The terminal should generate a protocol data unit (PDU) session in order to transmit and receive data through the UPF, and one PDU session may include one or more quality of service (QoS) flows. The terminal 210 may be indicated by a 'terminal,' 'user equipment (UE),' a 'mobile station,' a 'subscriber station,' a 'remote terminal,' a 'wireless terminal,' a 'user device,' 'customer premise equipment (CPE),' an 'electronic device,' or other terms having the same technical meaning as the above-mentioned terms. The terminal 210 may correspond to the electronic device 101 shown in FIG. 1.

The base station 220, which is a radio access network (RAN) node, is a network infrastructure for providing radio access to the terminal 210. The base station 220 may have a coverage that is defined as a predetermined geographical region based on a distance by which a signal may be transmitted. The base station 220 may cover one cell or may cover multiple cells. Herein, the multiple cells may be distinguished based on at least one of a frequency that the cells support or a domain of a sector that the cells cover. The base station 220 may be indicated by an 'access point (AP),' an eNodeB (eNB),' a '5th generation (5G) node,' a '5G NodeB,' a 'next generation node B (gNB),' a 'wireless point,' a 'transmission/reception point (TRP),' a 'distributed unit (DU),' a 'radio unit (RU),' a 'remote radio headroom (RRH),' or other terms having the same technical meaning as the above-mentioned terms, in addition to the base station.

Figure 3:
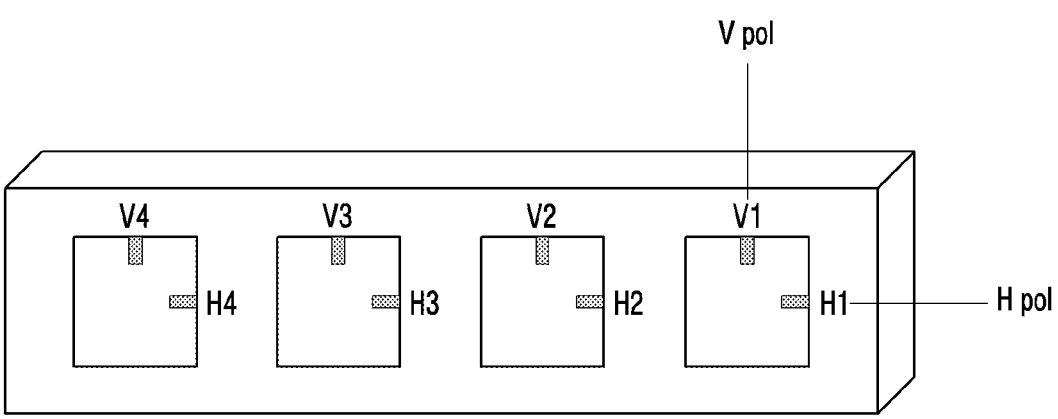
FIG. 3 is a view illustrating an antenna module according to various example embodiments.

FIG. 3 illustrates an antenna module according to example embodiments. As a frequency is higher, an attenuation characteristic of a transmitted signal may be stronger. Accordingly, the antenna module may include an antenna array having one or more antenna elements arranged therein.

Referring to FIG. 3, it is illustrated that the antenna module includes antenna elements arranged in a rectangular shape of 4×1, but this is merely an example. In example embodiments, the antenna module may include antenna elements arranged in the form of N1×N2. According to an embodiment, one physical antenna element may be mapped onto one or more logical antenna ports. In addition, one or more physical antenna elements may be mapped onto one logical antenna port. The antenna array may include a dual-polarized antenna element. For example, H1 to H4 may indicate a horizontal polarization (H-pol). In addition, V1 to V4 may indicate a vertical polarization (V-pol). In multiple input multiple output (MIMO) communication, two polarizations are used, but in single input single output (SISO) communication, only one polarization is used for instance. Accordingly, the terminal 210 which performs SISO communication may need to identify a polarization to use for uplink transmission. Referring to FIG. 3, it is illustrated that dual-polarizations are configured vertically/horizontally (crisscross (+) arrangement), but this is merely an example. In various example embodiments, the dual polarizations may be configured in various arrangements. For example, the dual polarizations may be configured to be positioned opposite each other in a diagonal direction (for example, X-shaped arrangement).

Figure 4:
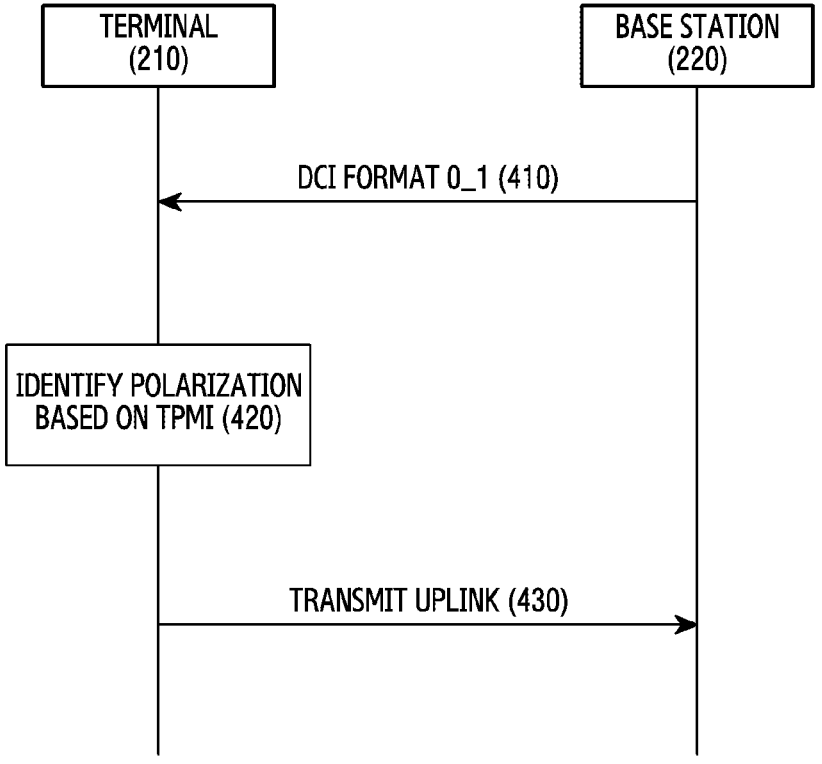
FIG. 4 is a view illustrating an example of signaling for identifying a polarization of uplink transmission.

FIG. 4 illustrates an example of signaling for identifying a polarization of uplink transmission. FIG. 4 illustrates a process in which the base station 220 indicates a polarization for the terminal 210 to use for uplink transmission.

Referring to FIG. 4, in operation 410, the terminal 210 may receive a downlink control information (DCI) format 0_1 from the base station. According to an embodiment, the DCI format 0_1 may be used to allocate resources for uplink transmission through a physical uplink shared channel (PUSCH). The DCI format 0_1 may include a field regarding precoding information and the number of layers. The field regarding the precoding information and the number of layers may indicate the number of one or more layers and a transmitted precoding matrix indicator (TPMI) all together. For example, the field regarding the precoding information and the number of layers may be configured as shown in table 1 presented below:

TABLE 1

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

In operation 402, the terminal 210 may identify a polarization for uplink transmission based on the TPMI. According to an embodiment, the TPMI may indicate a polarization of an antenna port for uplink transmission of the terminal. For example, if TPMI=0 in single input single output (SISO) communication (that is, rank=1) (for example, if the field regarding the precoding information and the number of layers indicates index 0 in table 1), the terminal 210 may identify a first polarization (for example, a vertical polarization (V-pol)) as a polarization for uplink transmission. In another example, if TPMI=1 in SISO communication (for example, if the field regarding the precoding information and the number of layers indicates index 1 in table 1), the terminal 210 may identify a second polarization (for example, a horizontal polarization (H-pol)) as a polarization for uplink transmission. In still another example, if the rank is greater than or equal to 2, the terminal 210 may perform multiple input multiple output (MIMO) communication by using two polarizations. In operation 430, the terminal 210 may transmit an uplink signal to the base station 220. According to an embodiment, the terminal 210 may transmit the uplink signal to the base station 220 through an uplink channel (for example, at least one channel of a physical uplink control channel (PUCCH) or a physical uplink shared channel (PUSCH)). The terminal 210 may transmit the uplink signal to the base station 220 based on the identified polarization. The uplink signal may be a signal that is scheduled by the received DCI format 0_1.

In FIG. 4, the process in which the base station 220 indicates a polarization to the terminal 210 to use for uplink transmission. However, before the TPMI is transmitted (for example, a random access procedure), or when the DCI does not include the TPMI (for example, when a DCI format 0_0 is received or when the TPMI is not included in the DCI format 0_1), the terminal may need to identify a polarization for uplink transmission by itself. A method for the terminal 210 to identify a polarization for uplink transmission may include a method of adaptively identifying a polarization based on quality of a received signal, and a method of using a pre-selected default polarization. However, the method of adaptively identifying the polarization based on the quality of the received signal may require a separate algorithm. In addition, the method of adaptively identifying the polarization based on the quality of the received signal may require a time to search the polarization. In addition, since the method of using the pre-selected default polarization does not guarantee that a polarization having excellent radio frequency (RF) radiation characteristics is used, the terminal 210 may not achieve optimal performance depending on a condition. Accordingly, there is a need for use of a polarization having excellent radiation characteristics according to a condition without requiring a separate algorithm and a search time.

Figure 5:
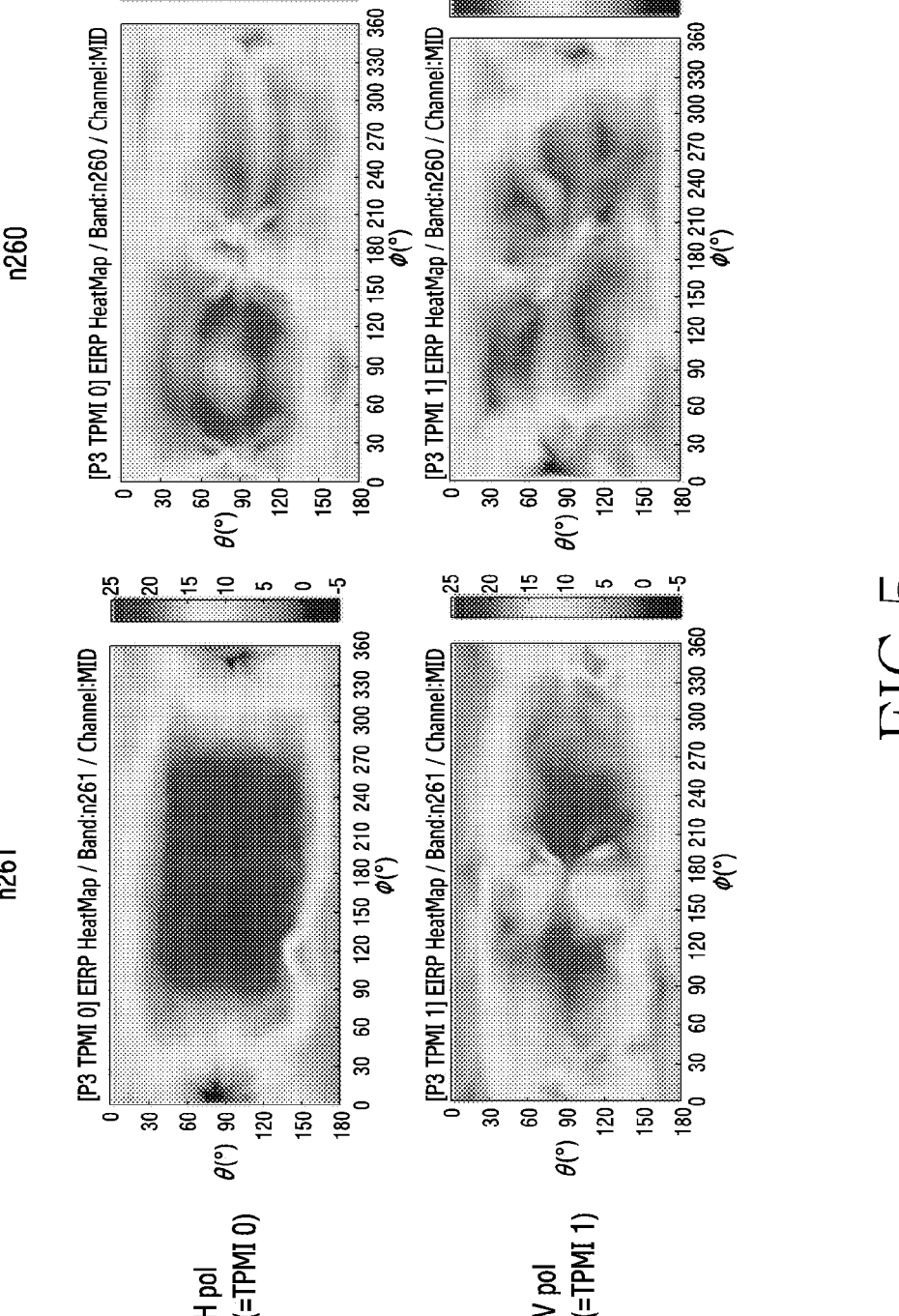
FIG. 5 is a view illustrating a difference in performance of respective polarizations according to a frequency band according to various example embodiments.

FIG. 5 illustrates a difference in performance of respective polarizations according to a frequency band according to example embodiments. A heatmap of FIG. 5 indicates a strength of a signal transmitted/received omni-directionally by the terminal 210 according to a polarization in a mid-channel of an operating band n261 or a mid-channel of an operating band n260.

According to an embodiment, the heatmap of FIG. 5 may be indicated by effective isotropic radiated power (EIRP) according to a cumulative distribution function (CDF) as shown in table 2 presented below, in order to compare performance of respective polarizations:

TABLE 2

| P3 EIRP CDF | n261 | | n260 | |
|---|---|---|---|---|
| | CDF 50% | CDF 100% | CDF 50% | CDF 100% |
| H pol | 17.9 | 24.6 | 16 | 23 |
| V pol | 16.3 | 22.7 | 16.3 | 21.2 |
| delta | 1.6 | 1.9 | −0.3 | 1.8 |

Referring to table 2, in the mid-channel of the operating band n261, the terminal 210 using a horizontal polarization (H-pol) may be more advantageous than using a vertical polarization (V-pol). In addition, if the CDF 100% is used as a reference for evaluating performance in the mid-channel of the operating band n260, the terminal 210 using a horizontal polarization may be more advantageous than using a vertical polarization. On the other hand, if the CDF 50% is used as a reference for evaluating performance in the mid-channel of the operating band n260, the terminal 210 using a vertical polarization may be more advantageous than using a horizontal performance.

Figure 6:
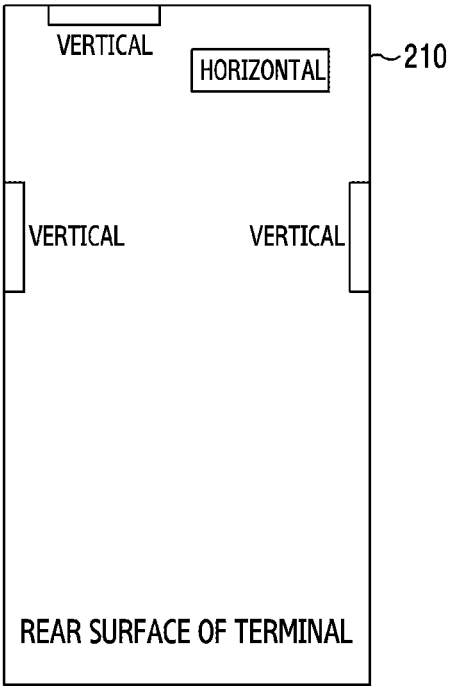
FIG. 6 is a view illustrating an example of positions of a terminal where antenna modules are mounted according to various example embodiments.

FIG. 6 illustrates positions of a terminal where antenna modules are mounted according to example embodiments. The antenna module may be referred to as a vertical antenna module or a horizontal antenna module according to a position of the terminal 210 where the antenna module is mounted. According to an embodiment, the horizontal antenna module may refer to an antenna module that is mounted on a rear surface of the terminal 210. In addition, the vertical antenna module may refer to an antenna module that is mounted on a lateral surface of the terminal 210. FIG. 6 illustrates the terminal 210 including four antenna modules, but this is merely an example. According to example embodiments, the terminal 210 may include one or more antenna modules.

As explained in FIG. 5, the terminal 210 may identify a polarization for uplink transmission based on a difference in performance of respective polarizations according to a frequency band. However, even antenna modules achieving the same performance may provide different optimal polarizations according to positions of the terminal 210 where the antenna modules are mounted. That is, since influences by a housing are different according to positions where the antenna modules are mounted (or positions where antennas included in the antenna modules are mounted), even the antenna modules achieving the same performance may provide different optimal polarizations. Accordingly, the terminal 210 may need to identify a polarization for uplink transmission by considering positions where antenna modules are mounted.

Figure 7:
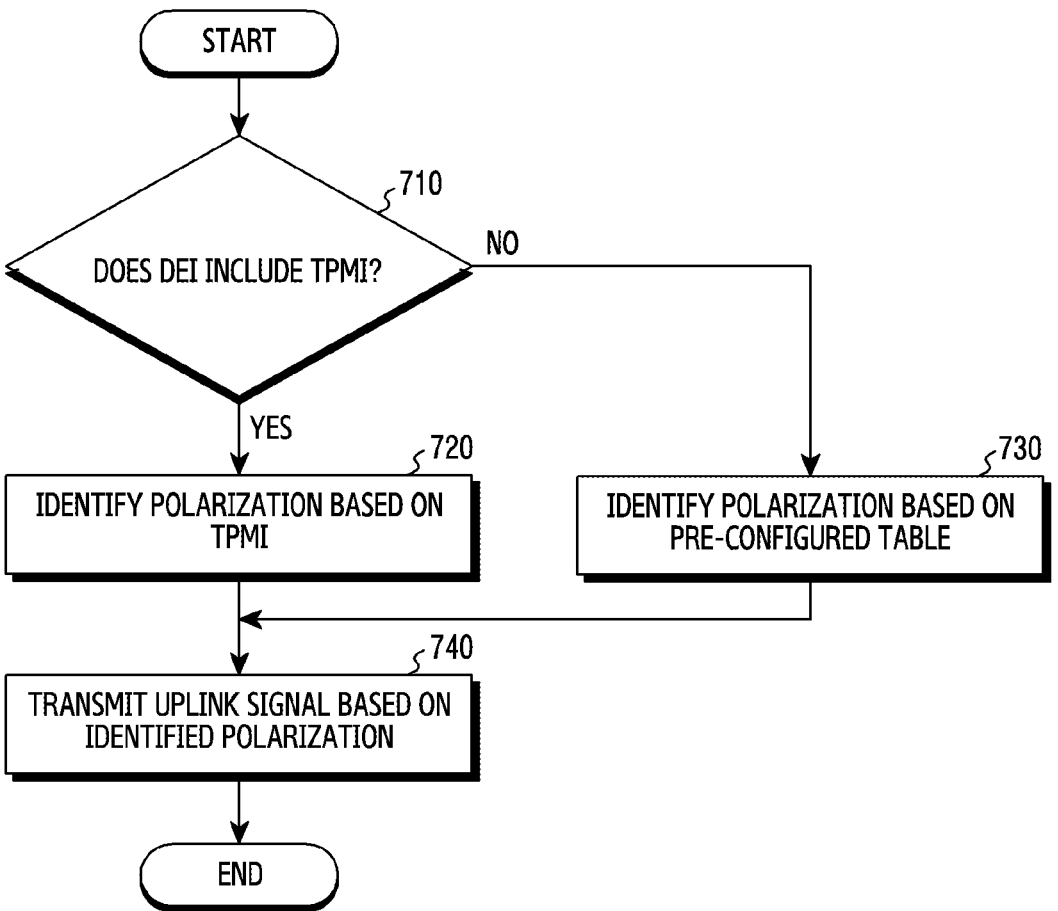
FIG. 7 is a view illustrating an operation flow of a terminal for identifying a polarization of uplink transmission according to various example embodiments.

FIG. 7 illustrates an operation flow of a terminal for identifying a polarization of uplink transmission according to example embodiments. FIG. 7 illustrates a process in which the terminal 210 identifies a polarization for uplink transmission when uplink transmission is scheduled through downlink control information (DCI).

Referring to FIG. 7, in operation 710, the terminal 210 may identify whether received DCI includes a transmitted precoding matrix indicator (TPMI).

According to an embodiment, the terminal 210 may identify a format of the received DCI.

According to an embodiment, the terminal 210 may identify whether the received DCI is DCI for scheduling uplink transmission or DCI for scheduling downlink transmission, based on a DCI format indicator included in the received DCI. For example, when the DCI format indicator is 0, the terminal 210 may identify that the DCI is the DCI for scheduling uplink transmission. In another example, when the DCI format indicator is 1, the terminal 210 may identify that the DCI is the DCI for scheduling downlink transmission.

According to an embodiment, when it is identified that the DCI is the DCI for scheduling uplink transmission, the terminal 210 may identify the DCI format based on the number of bits included in the DCI. The terminal 210 may identify whether the DCI format is a DCI format 0_0 or a DCI format 0_1, based on the number of bits included in the DCI.

According to an embodiment, the DCI format 00 may not include a field regarding precoding information and the number of layers. The field regarding the precoding information and the number of layers may indicate the number of one or more layers and a TPMI all together. That is, when the received DCI is identified as having the DCI format 00, the terminal 210 may identify that the received DCI does not include the TPMI.

According to an embodiment, the DCI format 0_1 may include the field regarding the precoding information and the number of layers. However, in the case of non-codebook-based transmission, the DCI format 0_1 may not include the field regarding the precoding information and the number of layers. In addition, in the case of codebook-based transmission using only one antenna port, the DCI format 0_1 may not include the field regarding the precoding information and the number of layers. According to an embodiment, in the case of codebook-based transmission using a plurality of antenna ports, the terminal 210 may identify that the received DCI includes the TPMI. According to an embodiment, the terminal 210 may receive configuration information regarding a physical uplink shared channel (PUSCH) from the base station. The configuration information regarding the PUSCH may be received through a radio resource control (RRC) message. The configuration information regarding the PUSCH may include a field (for example, txConfig) regarding uplink configuration. The field regarding the uplink configuration may indicate codebook-based transmission, non-codebook-based transmission, or may be emptied. When the field regarding the uplink configuration indicates the non-codebook-based transmission, the terminal 210 may identify that the received DCI does not include the TPMI. When the field regarding the uplink configuration is emptied, the terminal 210 may identify that the received DCI does not include the TPMI. According to an embodiment, when a value indicated by the field regarding the precoding information and the number of layers is not a pre-defined value (for example, −1), the terminal 210 may identify that the received DCI does not include the TPMI.

According to an embodiment, when it is identified that the DCI includes the TPMI, the terminal 210 may perform operation 720. According to an embodiment, when it is identified that the DCI does not include the TPMI, the terminal 210 may perform operation 730.

In operation 720, the terminal 210 may identify a polarization for uplink transmission based on the TPMI. According to an embodiment, the TPMI may indicate a polarization of an antenna port for uplink transmission of the terminal 210. For example, if TPMI=0 in single input single output (SISO) communication (that is, rank=1), the terminal 210 may identify a first polarization (for example, a vertical polarization (V-pol)) as a polarization for uplink transmission. In another example, if TPMI=1 in SISO communication, the terminal 210 may identify a second polarization (for example, a horizontal polarization (H-pol)) as a polarization for uplink transmission.

In operation 730, the terminal 210 may identify a polarization for uplink transmission, based on a pre-configured table (for example, a lookup table (LUT)). According to an embodiment, the terminal 210 may identify a polarization indicated by a combination of one or more variables in the pre-configured table, as a polarization for uplink transmission. The one or more variables may include at least one of an antenna module (or, antenna) used for uplink transmission, an operating band or a channel in the operating band. For example, the one or more variables may include at least one of antenna information, the operating band or the channel in the operating band.

According to an embodiment, the pre-configured table may be pre-configured to indicate a polarization indicting optimal performance, based on at least one of a mounting position of an antenna module (or, antenna information), an operating band, or a channel in the operating band. According to an embodiment, the polarization indicating the optimal performance may be a polarization that has a great maximum value of effective isotropic radiated power (EIRP). According to an embodiment, the polarization indicating the optimal performance may be a polarization that has a great EIRP value in a specific cumulative distribution function (CDF) (for example, 50%). For example, the pre-configured table may be configured as shown in table 3 presented below:

TABLE 3

| Band | n261 | | | n260 | | | n258 | | | n257 | | |
|---|---|---|---|---|---|---|---|---|---|---|---|---|
| Channel | L | M | H | L | M | H | L | M | H | L | M | H |
| Antenna module 1 | H | V | H | V | H | V | H | H | V | V | V | H |
| Antenna module 2 | V | V | H | V | V | H | H | V | H | H | V | H |

For example, when the antenna module 1 is used in the mid-channel of the operating band n261 for uplink transmission, the terminal 210 may identify V-pol as a polarization for uplink transmission. In another example, when the antenna module 2 is used in a low channel of the operating band n258 for uplink transmission, the terminal 210 may identify H-pol as a polarization for uplink transmission. In addition, the pre-configured table may also indicate a beam indicating optimal performance. According to an embodiment, the beam indicating the optimal performance may be a beam that has the greatest EIRP value. According to an embodiment, the beam indicating the optimal performance may be a beam that has the greatest EIRP value in a specific CDF (for example, 50%). For example, the pre-configured table may be configured as shown in table 4 presented below:

TABLE 4

| Band | n261 | | | n260 | | | n258 | | | n257 | | |
|---|---|---|---|---|---|---|---|---|---|---|---|---|
| Channel | L | M | H | L | M | H | L | M | H | L | M | H |
| Antenna module 1 | H | V | H | V | H | V | H | H | V | V | V | H |
| Antenna module 2 | V | V | H | V | V | H | H | V | H | H | V | H |
| Preferred beam | 25 | 25 | 27 | 122 | 125 | 125 | 31 | 32 | 30 | 42 | 45 | 44 |

In operation 740, the terminal 210 may transmit an uplink signal based on the identified polarization. According to an embodiment, the terminal 210 may transmit the uplink signal to the base station 220 through an uplink channel (for example, at least one channel of a physical uplink control channel (PUCCH) or a physical uplink shared channel (PUSCH)). The terminal 210 may transmit the uplink signal to the base station 220 based on the identified polarization. The uplink signal may be a signal that is scheduled by the received DCI format 0_1. Before operation 710, the terminal 210 may identify whether to perform SISO communication for uplink transmission although this is not illustrated in FIG. 7.

Figure 8:
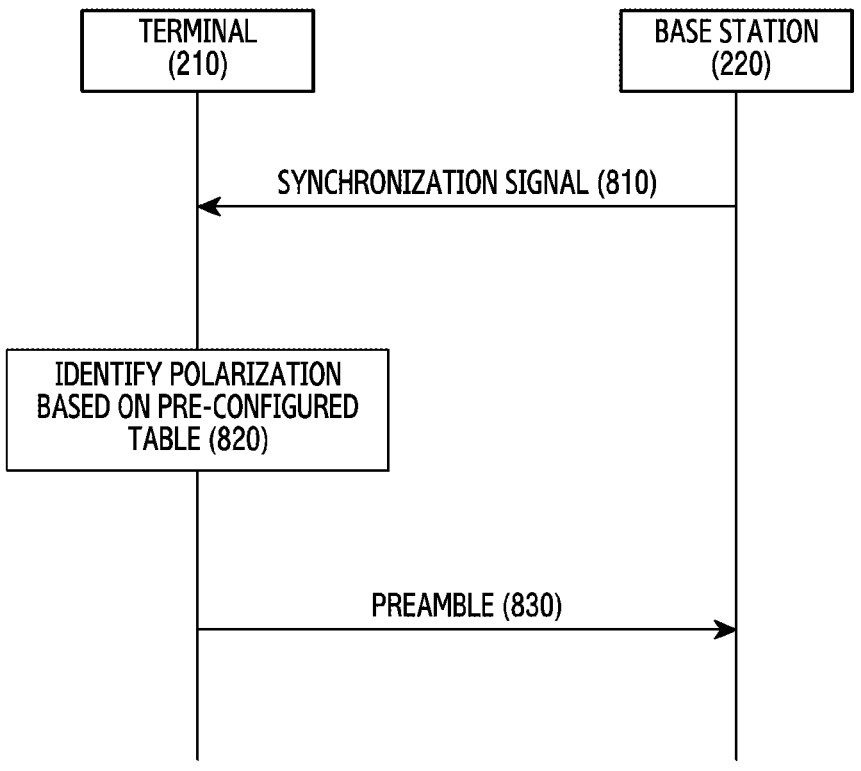
FIG. 8 is a view illustrating an example of signaling for identifying a polarization of uplink transmission according to various example embodiments.

FIG. 8 illustrates an example of signaling for identifying a polarization of uplink transmission according to example embodiments. FIG. 8 illustrates a process in which the terminal 210 identifies a polarization for uplink transmission in a random access procedure.

Referring to FIG. 8, in operation 810, the terminal 210 may receive a synchronization signal from the base station 220. According to an embodiment, the synchronization signal may be an SS/PBCH block.

In operation 820, the terminal 210 may identify a polarization for uplink transmission. According to an embodiment, the terminal 210 may identify the polarization for uplink transmission, based on a pre-configured table (for example, a lookup table (LUT)). The terminal 210 may identify a polarization indicated by a combination of one or more variables in the pre-configured table, as a polarization for uplink transmission. The one or more variables may include at least one of an antenna module that the terminal 210 uses for uplink transmission, an operating band or a channel in the operating band. According to an embodiment, the pre-configured table may be pre-configured to indicate a polarization indicating optimal performance according to at least one of a mounting position of an antenna module, an operating band or a channel in the operating band. According to an embodiment, the polarization indicating the optimal performance may be a polarization that has a great maximum value of effective isotropic radiated power (EIRP). According to an embodiment, the polarization indicating the optimal performance may be a polarization that has a great EIRP value in a specific cumulative distribution function (CDF) (for example, 50%). For example, the pre-configured table may be configured as shown in table 5 presented below:

TABLE 5

| Band | n261 | | | n260 | | | n258 | | | n257 | | |
|---|---|---|---|---|---|---|---|---|---|---|---|---|
| Channel | L | M | H | L | M | H | L | M | H | L | M | H |
| Antenna module 1 | H | V | H | V | H | V | H | H | V | V | V | H |
| Antenna module 2 | V | V | H | V | V | H | H | V | H | H | V | H |

For example, when the antenna module 2 is used in the mid-channel of the operating band n257 for uplink transmission, the terminal 210 may identify a vertical polarization (V-pol) as a polarization for uplink transmission. In another example, when the antenna module 1 is used in a high channel of the operating band n261 for uplink transmission, the terminal 210 may identify a horizontal polarization (H-pol) as a polarization for uplink transmission. In addition, the pre-configured table may also indicate a beam indicating optimal performance. According to an embodiment, the beam indicating the optimal performance may be a beam that has the greatest EIRP value. According to an embodiment, the beam indicating the optimal performance may be a beam that has the greatest EIRP value in a specific CDF (for example, 50%). For example, the pre-configured table may be configured as shown in table 6 presented below:

15

16

TABLE 6

| Band | n261 | | | n260 | | | n258 | | | n257 | | |
|---|---|---|---|---|---|---|---|---|---|---|---|---|
| Channel | L | M | H | L | M | H | L | M | H | L | M | H |
| Antenna module 1 | H | V | H | V | H | V | H | H | V | V | V | H |
| Antenna module 2 | V | V | H | V | V | H | H | V | H | H | V | H |
| Preferred beam | 25 | 25 | 27 | 122 | 125 | 125 | 31 | 32 | 30 | 42 | 45 | 44 |

In operation 830, the terminal 210 may transmit a preamble based on the identified polarization. According to an embodiment, the terminal 210 may transmit the preamble according to a polarization which is identified based on a TPMI. According to an embodiment, the terminal 210 may transmit the preamble according to a polarization which is identified based on the pre-configured table. In addition, the terminal 210 may transmit the preamble according to a beam which is identified based on the pre-configured table.

Figure 9:
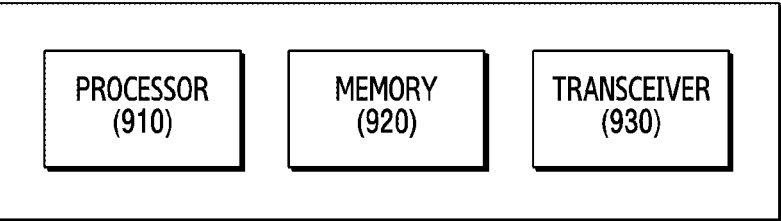
FIG. 9 is a view illustrating a configuration of a terminal according to various example embodiments.

FIG. 9 illustrates a configuration of a terminal according to example embodiments. Referring to FIG. 9, the terminal 210 may include a processor 910, a memory 920, a transceiver 930. Of course, each processor herein comprises processing circuitry.

The processor 910 may control overall operations of the terminal 210. For example, the processor 910 may transmit and receive signals through the transceiver 930. In addition, the processor 910 may perform functions of a protocol stack required by communication standards. To achieve this, the processor 910 may include at least one processor. The processor 910 may control the terminal 210 to perform operations according to the above-described embodiments.

The memory 920 may store data such as a basic program for operations of the terminal 210, an application program, configuration information, etc. The memory 920 may be configured by a volatile memory, a nonvolatile memory, or a combination of a volatile memory and a nonvolatile memory. The memory 920 may provide stored data according to a request of the processor 910.

The transceiver 930 may perform functions for transmitting and receiving signals through a wired channel or a wireless channel. For example, the transceiver 930 may perform a function of converting between a baseband signal and a bit stream according to a physical layer standard of a system. For example, when transmitting data, the transceiver 930 may generate complex symbols by encoding and modulating a transmission bit stream. In addition, when receiving data, the transceiver 930 may restore a reception bit stream by demodulating and decoding a baseband signal. In addition, the transceiver 930 may up-convert a baseband signal into a radio frequency (RF) band signal, and then may transmit the signal via an antenna, and may down-convert an RF band signal received via an antenna into a baseband signal. To achieve this, the transceiver 930 may include a transmission filter, a reception filter, an amplifier, a mixer, an oscillator, a digital-to-analogue converter (DAC), an analogue-to-digital converter (ADC), etc.

In addition, the transceiver 930 may include a plurality of transmission and reception paths. Furthermore, the transceiver 930 may include an antenna unit comprising at least one antenna. The transceiver 930 may include at least one antenna array configured with a plurality of antenna elements. In the hardware aspect, the transceiver 930 may be configured by a digital circuit and an analog circuit (for example, a radio frequency integrated circuit (RFIC)).

Herein, the digital circuit and the analogue circuit may be implemented as a single package. In addition, the transceiver 930 may include a plurality of RF chains. Furthermore, the transceiver 930 may perform beamforming. The transceiver 930 may apply a beamforming weight to a signal in order to give directionality according to configuration of the processor 920 to a signal to transmit or receive.

In addition, the transceiver 930 may transmit and receive signals. To achieve this, the transceiver 930 may include at least one transceiver. The transceiver 930 may receive a downlink signal. The downlink signal may include a synchronization signal, a reference signal, a configuration message, control information or downlink data. In addition, the transceiver 930 may transmit an uplink signal. The uplink signal may include a random access-related signal (for example, a preamble, a message 3 (msg 3)), a reference signal, a power headroom report (PHR), uplink data, etc.

In addition, the transceiver 930 may include different communication modules to process signals of different frequency bands. Furthermore, the transceiver 930 may include a plurality of communication modules (each comprising communication circuitry) to support a plurality of different radio access techniques. For example, the different radio access techniques may include Bluetooth low energy (BLE), wireless fidelity (Wi-Fi), a cellular network (for example, long term evolution (LTE), new radio (NR)), etc. In addition, the different frequency bands may include a super high frequency (SHF) (for example, 2.5 GHz, 5 GHz) band, a millimeter wave (for example, 38 GHz, 60 GHz, etc.) band. In addition, the transceiver 930 may use the same radio access technique in the different frequency bands (for example, an unlicensed band for licensed assisted access (LAA), citizens broadband radio service (CBRS) (for example, 3.5 GHz)). The transceiver 930 may be referred to as a communication circuit.

Through FIGS. 1 to 9, the technique for the terminal to identify a polarization for uplink transmission by itself before a transmitted precoding matrix indicator (TPMI) is transmitted on a call flow in a wireless communication system or when downlink control information (DCI) does not include the TPMI has been described. In a related-art method, the terminal may adaptively identify a polarization based on quality of a received signal, and thus, may require a separate algorithm and a search time. In addition, the related-art method may use a default polarization and may not guarantee that a polarization having excellent radiation characteristics is used. Accordingly, in example embodiments, a lookup table (LUT) is configured to indicate an optimal polarization by pre-measuring radiated power according to a position of a terminal where an antenna module (comprising at least one antenna) is mounted, an operating band, a channel in the operating band. Accordingly, the terminal may identify an optimal polarization from the LUT according to an antenna module used for uplink transmission, an operating band, a channel in the operating band, so that a polarization having excellent radiation characteristics may be used for uplink transmission without requiring an algorithm and a search time.

According to an example embodiment described above, an electronic device in a wireless communication system may include: a communication circuit; and at least one processor operatively connected, directly or indirectly, to the communication circuit, and the at least one processor may be configured to: receive downlink control information (DCI) from a base station; when the DCI does not include information indicating a transmitted precoding matrix indicator (TPMI), and, when a combination of one or more variables indicates a first polarization in a pre-configured table, transmit an uplink signal to the base station by using the first polarization; and, when the combination of the one or more variables indicates a second polarization in the pre-configured table, transmit the uplink signal to the base station by using the second polarization, and the one or more variables may include at least one of an antenna module comprising at least one antenna, an operating band, or a channel which is used for transmitting the uplink signal.

According to an embodiment, the uplink signal may be transmitted based on a beam indicated by the combination of the one or more variables in the pre-configured table.

According to an embodiment, the pre-configured table may be configured with one or more effective isotropic radiated power (EIRP) values which are measured based on at least one of positions of one or more antenna modules mounted in the electronic device (or, antenna information), one or more operating bands or one or more channels.

According to an embodiment, the one or more EIRP values may be determined based on a cumulative distribution function (CDF) configuration.

According to an embodiment, the at least one processor may be configured to identify a DCI format, based on a number of bits included in the DCI and a DCI format indicator included in the DCI.

According to an embodiment, the at least one processor may be configured to identify that the DCI does not include the information indicating the TPMI when the DCI format is 0_0.

According to an embodiment, the at least one processor may be configured to receive configuration information regarding a physical uplink shared channel (PUSCH) through a radio resource control (RRC) message, and to identify that the DCI does not include the information indicating the TPMI when a field regarding uplink configuration, which is included in the configuration information regarding the PUSCH, indicates non-codebook-based transmission or is emptied.

According to an embodiment, the at least one processor may be configured to: receive a synchronization signal from the base station; identify a polarization for transmitting a preamble, based on the pre-configured table; and transmit the preamble to the base station based on the identified polarization.

According to an embodiment, the at least one processor may be configured to: receive a random access response (RAR) from the base station; identify a polarization for transmitting a message 3 based on the pre-configured table; and transmit the message 3 to the base station based on the identified polarization.

According to an embodiment, the first polarization may correspond to a vertical polarization, and the second polarization may correspond to a horizontal polarization.

According to an example embodiment as described above, a method performed by an electronic device in a wireless communication system may include: receiving downlink control information (DCI) from a base station; when the DCI does not include information indicating a transmitted precoding matrix indicator (TPMI), and, when a combination of one or more variables indicates a first polarization in a pre-configured table, transmitting an uplink signal to the base station by using the first polarization; and, when the combination of the one or more variables indicates a second polarization in the pre-configured table, transmitting the uplink signal to the base station by using the second polarization, and the one or more variables may include at least one of an antenna module, an operating band, or a channel which is used for transmitting the uplink signal.

According to an embodiment, the uplink signal may be transmitted based on a beam indicated by the combination of the one or more variables in the pre-configured table.

According to an embodiment, the pre-configured table may be configured with one or more effective isotropic radiated power (EIRP) values which are measured based on at least one of positions of one or more antenna modules mounted in the electronic device, one or more operating bands or one or more channels.

According to an embodiment, the one or more EIRP values may be determined based on a cumulative distribution function (CDF) configuration.

According to an embodiment, the method may include identifying a DCI format, based on a number of bits included in the DCI and a DCI format indicator included in the DCI.

According to an embodiment, the method may include identifying that the DCI does not include the information indicating the TPMI when the DCI format is 0_0.

According to an embodiment, the method may include: receiving configuration information regarding a physical uplink shared channel (PUSCH) through a radio resource control (RRC) message; and identifying that the DCI does not include the information indicating the TPMI when a field regarding uplink configuration, which is included in the configuration information regarding the PUSCH, indicates non-codebook-based transmission or is emptied.

According to an embodiment, the method may include: receiving a synchronization signal from the base station; identifying a polarization for transmitting a preamble, based on the pre-configured table; and transmitting the preamble based on the identified polarization.

According to an embodiment, the method may include: receiving a random access response (RAR) from the base station; identifying a polarization for transmitting a message 3 based on the pre-configured table; and transmitting the message 3 to the base station based on the identified polarization.

According to an embodiment, the first polarization may correspond to a vertical polarization, and the second polarization may correspond to a horizontal polarization.

It should be appreciated that various example embodiments and the terms used therein are not intended to limit the technological features set forth herein to particular embodiments and include various changes, equivalents, or alternatives for a corresponding embodiment. With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EE-PROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the example embodiments. In addition, an additional storage device on a communication network may access to a device which performs the example embodiments.

In the above-described specific example embodiments, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed descriptions of the disclosure, it will be understood by those skilled in the art that various changes may be made therein without departing from the spirit and scope of the disclosure. Therefore, the scope of the disclosure should be defined not by the described embodiments but by the appended claims or the equivalents to the claims. While disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device in a wireless communication system, the electronic device comprising:
a communication circuit;
at least one processor electrically connected with the communication circuit; and
memory storing instructions that, when executed by the at least one processor individually or collectively, cause the electronic device to:
    receive, from a base station, downlink control information (DCI) for an uplink signal,
    identify whether the DCI includes transmitted precoding matrix indicator (TPMI) information for indicating a polarization of the uplink signal,
    in case that the DCI does not include the TPMI information;
        identify the polarization of the uplink signal, based on a combination of parameters associated with the uplink signal, and
        transmit, to the base station, the uplink signal having the polarization identified based on the combination of the parameters;
    wherein the combination of the parameters comprises two or more of a location of an antenna module for transmitting the uplink signal, a frequency band of the uplink signal, or a channel used for transmitting the uplink signal.

2. The electronic device of claim 1, wherein the uplink signal is transmitted based on a beam corresponding to the polarization indicated by the combination of the parameters associated with the uplink signal.

3. The electronic device of claim 1, wherein the polarization of the uplink signal is identified from a pre-configured table, and
    wherein the pre-configured table is configured with locations of one or more antenna modules in the electronic device, one or more operating bands, or one or more channels.

4. The electronic device of claim 3, wherein the pre-configured table indicates a polarization having a maximum effective isotropic radiated power (EIRP) among two polarizations for each combination of the parameters, and
    wherein an EIRP is determined based on a cumulative distribution function (CDF) configuration.

5. The electronic device of claim 1, wherein the instructions, when executed by the at least one processor individually or collectively, cause the electronic device to:
    identify a DCI format, based on a number of bits included in the DCI and a DCI format indicator included in the DCI.

6. The electronic device of claim 5, wherein the instructions, when executed by the at least one processor individually or collectively, cause the electronic device to:
    identify that the DCI does not include the TPMI information, in case that the DCI format is 0_0.

7. The electronic device of claim 5, wherein the instructions, when executed by the at least one processor individually or collectively, cause the electronic device to:
    receive configuration information on a physical uplink shared channel (PUSCH) through a radio resource control (RRC) message, and
    identify that the DCI does not include the TPMI information, in case that a field on uplink configuration, which is included in the configuration information on the PUSCH, indicates non-codebook-based transmission or is emptied.

8. The electronic device of claim 1, wherein the instructions, when executed by the at least one processor individually or collectively, cause the electronic device to:
    receive a synchronization signal from the base station;

identify a first polarization for transmitting a preamble signal, based on a pre-configured table; and transmit the preamble signal to the base station based on the identified first polarization.

9. The electronic device of claim 8, wherein the instructions, when executed by the at least one processor individually or collectively, cause the electronic device to:

receive a random access response (RAR) from the base station;

identify a first polarization for transmitting a message 3 based on the pre-configured table; and transmit the message 3 to the base station based on the identified first polarization.

10. The electronic device of claim 1, wherein the polarization is a vertical polarization or a horizontal polarization.

11. A method performed by an electronic device in a wireless communication system, the method comprising:

receiving, from a base station, downlink control information (DCI) for an uplink signal;

identifying whether the DCI includes transmitted precoding matrix indicator (TPMI) information for indicating a polarization of the uplink signal;

in case that the DCI does not include the TPMI information:

identifying the polarization of the uplink signal, based on a combination of parameters associated with the uplink signal; and transmitting, to the base station, the uplink signal having the polarization identified based on the combination of the parameters, wherein the combination of the parameters comprises two or more of a location of an antenna module for transmitting the uplink signal, a frequency band of the uplink signal, and a channel used for transmitting the uplink signal.

12. The method of claim 11, wherein the uplink signal is transmitted based on a beam corresponding to the polarization indicated by the combination of the parameters associated with the uplink signal.

13. The method of claim 11, wherein the polarization of the uplink signal is identified from a pre-configured table, and wherein the pre-configured table is configured with locations of one or more antenna modules in the electronic device, one or more operating bands, or one or more channels.

14. The method of claim 13, wherein the pre-configured table indicates a polarization having a maximum effective isotropic radiated power (EIRP) among two polarizations for each combination of the parameters, and wherein an EIRP is determined based on a cumulative distribution function (CDF) configuration.

15. The method of claim 11, further comprising:

identifying a DCI format, based on a number of bits included in the DCI and a DCI format indicator included in the DCI.

16. The method of claim 15, further comprising:

identifying that the DCI does not include the TPMI information, in case that the DCI format is 0_0.

17. The method of claim 15, further comprising:

receiving configuration information on a physical uplink shared channel (PUSCH) through a radio resource control (RRC) message, and identifying that the DCI does not include the TPMI information, in case that a field on uplink configuration, which is included in the configuration information on the PUSCH, indicates non-codebook-based transmission or is emptied.

18. The method of claim 11, further comprising:

receiving a synchronization signal from the base station;

identifying a first polarization for transmitting a preamble signal, based on a pre-configured table; and transmitting the preamble signal to the base station based on the identified first polarization.

19. The method of claim 18, further comprising:

receiving a random access response (RAR) from the base station;

identifying a first polarization for transmitting a message 3 based on the pre-configured table; and transmitting the message 3 to the base station based on the identified first polarization.

20. The method of claim 11, wherein the polarization is a vertical polarization or a horizontal polarization.

* * * * *